(12) United States Patent
Kim et al.

(10) Patent No.: US 12,044,923 B2
(45) Date of Patent: Jul. 23, 2024

(54) DISPLAY DEVICE

(71) Applicant: LG ELECTRONICS INC., Seoul (KR)

(72) Inventors: Jaehyeok Kim, Seoul (KR); Daewon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 73 days.

(21) Appl. No.: 17/776,996

(22) PCT Filed: Nov. 13, 2019

(86) PCT No.: PCT/KR2019/015435
§ 371 (c)(1),
(2) Date: May 13, 2022

(87) PCT Pub. No.: WO2021/095913
PCT Pub. Date: May 20, 2021

(65) Prior Publication Data
US 2022/0413339 A1    Dec. 29, 2022

(51) Int. Cl.
*G02F 1/13357*    (2006.01)
*G02F 1/1335*    (2006.01)

(52) U.S. Cl.
CPC .. *G02F 1/133603* (2013.01); *G02F 1/133524* (2013.01); *G02F 1/133607* (2021.01)

(58) Field of Classification Search
None
See application file for complete search history.

(56) References Cited

U.S. PATENT DOCUMENTS

2011/0255029 A1    10/2011    Kubota et al.
2013/0223096 A1*    8/2013    Kim ................. G02B 6/0036
362/608

FOREIGN PATENT DOCUMENTS

| KR | 1020080022717 | 3/2008 |
| KR | 10-2011-0134439 | 12/2011 |
| KR | 1020120049971 | 5/2012 |
| KR | 1020120065752 | 6/2012 |
| KR | 101287636 | 7/2013 |

OTHER PUBLICATIONS

PCT International Application No. PCT/KR2019/015435, International Search Report dated Aug. 6, 2020, 4 pages.
Korean Intellectual Property Office Application No. 10-2022-7015529, Office Action dated Nov. 29, 2023, 5 pages.

* cited by examiner

*Primary Examiner* — Phu Vu
(74) *Attorney, Agent, or Firm* — LEE, HONG, DEGERMAN, KANG & WAIMEY

(57) ABSTRACT

A display device is disclosed. The display device of the present disclosure comprises: a display panel; a frame positioned behind the display panel; a first light source positioned between the display panel and the frame and providing light to the display panel; a second light source adjacent to and spaced apart from the first light source; a substrate on which the first light source and the second light source are mounted and which is positioned in front of the frame; a first light guide plate positioned on the substrate and the first light source; and a second light guide plate positioned on the substrate and the second light source and spaced apart from the first light guide plate.

13 Claims, 22 Drawing Sheets

1240

DISPLAY DEVICE

CROSS-REFERENCE TO RELATED APPLICATIONS

This application is the National Stage filing under 35 U.S.C. 371 of International Application No. PCT/KR2019/015435, filed on Nov. 13, 2019, the contents of which are all incorporated by reference herein in their entirety.

TECHNICAL FIELD

The present disclosure relates to a display device.

BACKGROUND ART

With the development of an information society, a demand for a display device increases in various forms, and according to the demand, in recent years, various display devices including a liquid crystal display (LCD), an electro luminescent display (ELD), a vacuum fluorescent display (VFD), an organic light emitting diode (OLED), etc., have been researched and used.

Among them, a liquid crystal panel of the LCD may include a liquid crystal layer, and a TFT substrate and a color filter substrate opposite to each other with the liquid crystal layer interposed therebetween, and display an image by using light provided from a backlight unit.

In recent years, as an image quality provided from the display device has been developed to a high image quality, a research into the backlight unit providing the light to a display panel has been actively conducted. As an example, while the image quality provided by the display device is enhanced from 4 K to 8 K, light transmittance of the display panel is degraded (e.g., by approximately 50%), and a need for the backlight unit capable of effectively providing more light to the display panel is emerged in order to maintain a constant brightness of an image provided by the display device.

DISCLOSURE

Technical Problem

The present disclosure provides solving the problems and other problems. The present disclosure may also provide a display device in which light efficiency of a backlight unit is improved.

The present disclosure may also provide a display device in which reliability of the backlight unit is enhanced.

The present disclosure may also provide a display device capable of reducing power consumed in the backlight unit.

The present disclosure may also provide a display device capable of enhancing spatial efficiency.

Technical Solution

In order to achieve the or another object, according to an aspect of the present disclosure, a display device may be provided, which includes: a display panel; a frame positioned in a rear of the display panel; a first light source positioned between the display panel and the frame, and providing light to the display panel; a second light source adjacent to the first light source, and positioned spaced apart from the first light source; a substrate mounted with the first and second light sources, and positioned on a front surface of the frame; a first light guide panel positioned on the substrate and the first light source; and a second light guide panel positioned on the substrate and the second light source, and spaced apart from the first light guide panel.

Advantageous Effects

Effects of a display device according to the present disclosure will be described below.

According to at least one of embodiments of the present disclosure, a display device in which light efficiency of a backlight unit is improved can be provided.

According to at least one of embodiments of the present disclosure, a display device in which reliability of the backlight unit is enhanced can be provided.

According to at least one of embodiments of the present disclosure, a display device capable of reducing power consumed in the backlight unit can be provided.

According to at least one of embodiments of the present disclosure, a display device capable of enhancing spatial efficiency can be provided.

An additional range of an applicability of the present disclosure will be apparent from the following detailed description. However, since various changes and modifications can be clearly appreciated by those skilled in the art within the spirit and the scope of the present disclosure, the detailed description and a specific embodiment such as a preferred embodiment of the present disclosure should be appreciated as being just given as an example.

BEST MODE FOR DISCLOSURE

Figure 1:
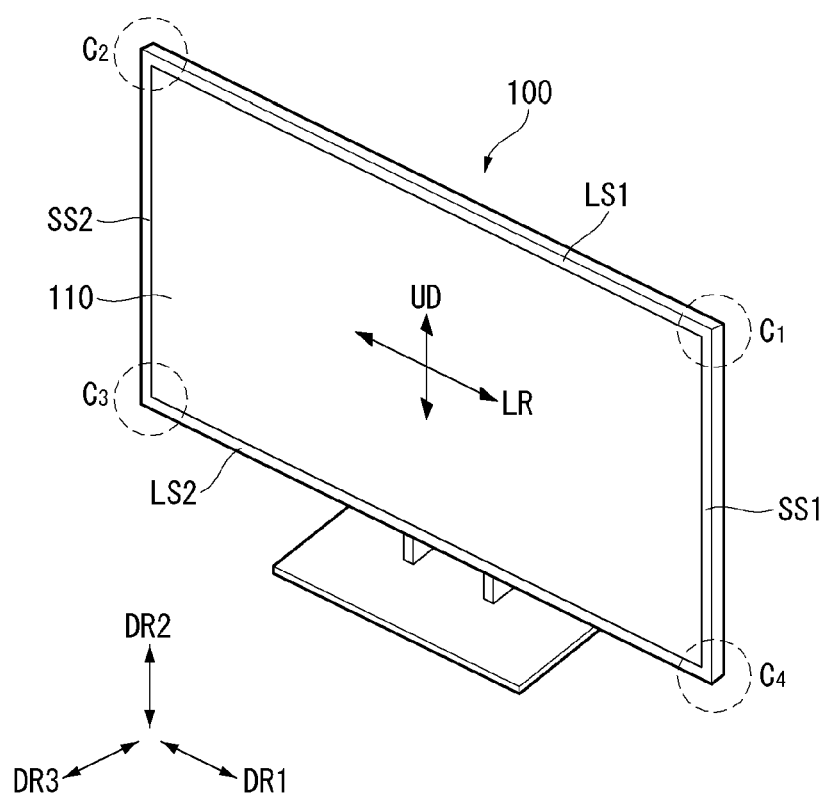
FIGS. 1 to 5 are diagrams illustrating examples of a display device according to the present disclosure.

Hereinafter, embodiments disclosed in the present disclosure will be described in detail with reference to the accompanying figures and the same or similar components are denoted by the same reference numerals regardless of a sign of the figure, and duplicated description thereof will be omitted.

Suffixes "module" and "unit" for components used in the following description are given or mixed in consideration of easy preparation of the present disclosure only and do not have their own distinguished meanings or roles. Further, in describing the embodiment of the present disclosure, a detailed description of related known technologies will be omitted if it is determined that the detailed description makes the gist of the embodiment disclosed in the present disclosure unclear. Further, it is to be understood that the accompanying figures are just used for easily understanding the embodiments disclosed in the present disclosure and a technical spirit disclosed in the present disclosure is not limited by the accompanying figures and all changes, equivalents, or substitutes included in the spirit and the technical scope of the present disclosure are included.

Hereinafter, a display panel will be described by taking a liquid crystal display device (LCD)) as an example, but the display panel which may be applied to the present disclosure is not limited to the LCD.

Moreover, hereinafter, a display device 100 may include a first long side LS1, a second long side LS2 facing the first long side LS1, a first short side SS1 contiguous to the first long side LS1 and the second long side LS2, and a second short side SS2 facing the first short side SS1.

Here, a first short side area SS1 may be referred to as a first side area, a second short side area SS2 may be referred to as a second side area facing the first side area, a first long side area LS1 may be referred to as a third side area contiguous to the first side area and the second side area, and positioned between the first side area and the second side area, and a second long side area LS2 may be referred to as a fourth side area contiguous to the first side area and the second side area, and positioned between the first side area and the second side area, and facing the third side area.

Moreover, for convenience of description, it is illustrated and described that lengths of the first and second long sides LS1 and LS2 are larger than lengths of the first and second short sides SS1 and SS2, respectively, but the lengths of the first and second long sides LS1 and LS2 may also be approximately equal to the lengths of first and second short sides SS1 and SS2, respectively.

Moreover, hereinafter, a first direction DR1 may be a direction parallel to the long sides LS1 and LS2 of the display device 100, and a second direction DR2 may be a direction parallel to the short sides SS1 and SS2 of the display device 100. The third direction DR3 may be a direction vertical to the first direction DR1 and/or the second direction DR2.

The first direction DR1 and the second direction DR2 may be collectively referred to as a horizontal direction. Moreover, the third direction DR3 may be referred to as a vertical direction.

A side to which the display device 100 displays an image may be referred to as a front or a front surface or front side. When the display device 100 displays the image, a side where the image may not be observed may be referred to as a rear or back or a rear surface or rear side or back surface or back side. When the display device 100 is viewed at the front or front surface, the first long side LS1 may be referred to as a top or a top surface or upper surface or upper side. The second long side LS2 may be referred to as a bottom or a bottom surface, lower surface, or lower side. A first short side SS1 side may be referred to as a right or a right surface or a right side and a second short side SS2 side may be referred to as a left or a left surface or a left side.

The first long side LS1, the second long side LS2, the first short side SS1, and the second short side SS2 may be referred to as edges of the display device 100. Further, a point where the first long side LS1, the second long side LS2, the first short side SS1, and the second short side SS2 meet each other may be referred to as a corner. For example, a point where the first long side LS1 and the first short side SS1 meet may become a first corner C1, a point where the first long side LS1 and the second short side SS2 meet may become a second corner C2, a point where the second short side SS2 and the second long side LS2 meet may become a third corner C3, and a point where the second long side LS2 and the first short side SS1 meet may become a fourth corner C4.

Here, a direction toward the second short side SS2 from the first short side SS1 or a direction toward the first short side SS1 from the second short side SS2 may be referred to as a left and right direction LR. A direction toward the second long side LS2 from the first long side LS1 or a direction toward the first long side LS1 from the second long side LS2 may be referred to as an up and down direction UD.

Figure 2:
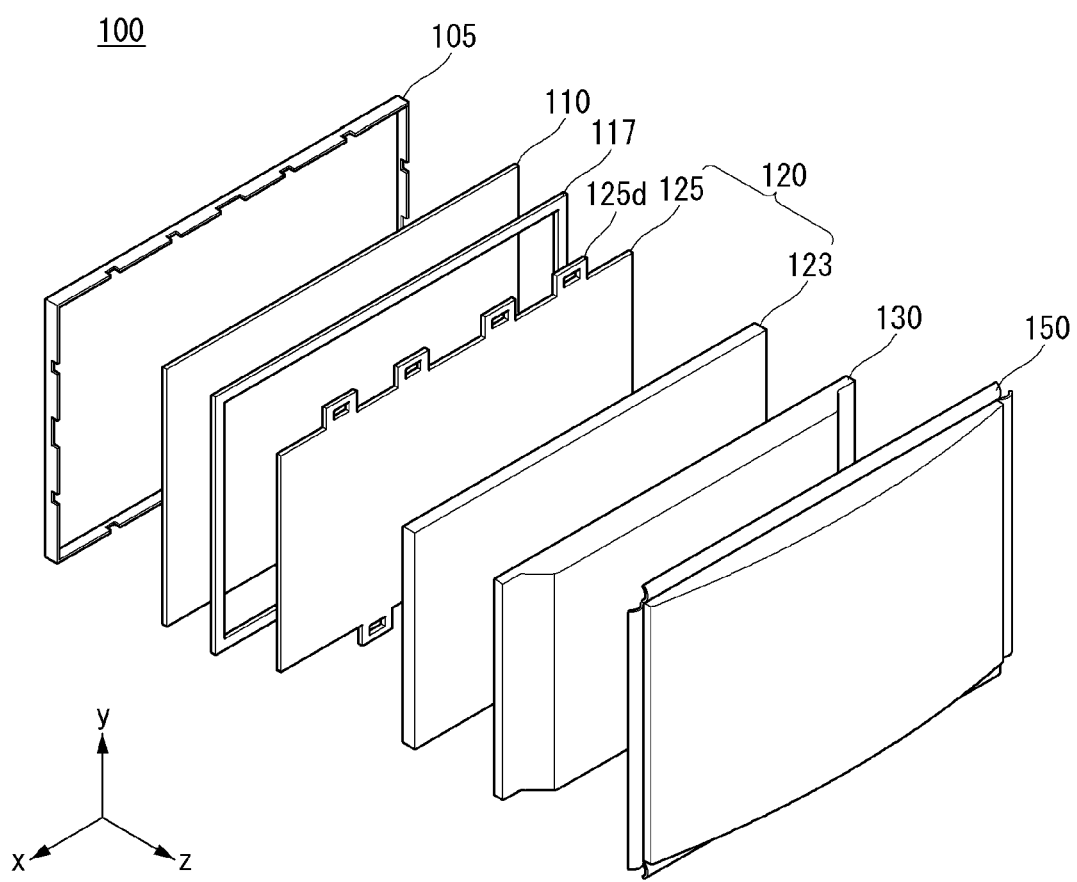

Referring to FIGS. 1 and 2, the display panel 110 may be positioned in front of the display device 100 and may display an image. The display panel 110 may include a plurality of pixels, and output the image according to a color, brightness, and a chroma for each pixel.

The display panel 110 may be divided into an active area which displays the image and an inactive area which does not display the image. The display panel 110 may include a front substrate and a rear substrate opposite to each other with the liquid crystal layer interposed therebetween.

The front substrate may include a plurality of pixels constituted by red (R), green (G), and blue (B) sub-pixels. The front substrate may generate a color corresponding to a red, a green, or a blue according to a control signal.

The rear substrate may include switching elements. The rear substrate may switch a pixel electrode. For example, the pixel electrode may change a molecular array of the liquid crystal layer according to a control signal applied from the outside. The liquid crystal layer may include a plurality of liquid crystal molecules. The liquid crystal molecules may change the array in response to a voltage difference generated between the pixel electrode and a common electrode. The liquid crystal layer may transfer the light provided from the backlight unit 120 to the front substrate.

A front cover 105 may cover at least a partial area of a front surface and a side surface of the display panel 110. The front cover 105 may be a rectangular frame shape in which a center is empty.

The front cover 105 may be divided into a front cover and a side cover. That is, this means that the front cover 105 may be divided into the front cover positioned at the front surface of the display panel 110 and the side cover positioned at the side surface of the display panel 110. The front cover and the side cover may be separately configured. Any one of the front cover and the side cover may be omitted. For example, it means that a case where for a purpose such as a beautiful design, etc., the front cover is not present and the side cover is present may be possible.

A guide panel 117 may be positioned in a rear of the display panel 110. The guide panel 117 may support a part of the rear surface of the display panel 110. The guide panel 117 may be in contact with an outer periphery of the display panel 110. The guide panel 117 may be coupled to a frame 130.

The backlight unit 120 may be positioned in the rear of the display panel 110. The backlight unit 120 may include a plurality of light sources. The backlight unit 120 may be a direct type or an edge type. The edge type backlight unit 120 may further include a light guide unit or a light guide panel (LGP).

The backlight unit 120 may be positioned on the front surface of the frame 130. For example, it may mean that the plurality of light sources may be disposed on the front surface of the frame 130, and this may be collectively referred to as a direct type backlight unit.

The backlight unit 120 may be driven in a total driving scheme or a partial driving scheme such as local dimming, impulsive, etc. The backlight unit 120 may include an optical sheet 125 and an optical layer 123.

The optical sheet 125 may distribute light of the light source. The optical sheet 125 may be constituted by a plurality of layers. For example, the optical sheet 125 may include at least one prism sheet and/or at least one diffusion sheet.

The optical sheet 125 may include at least one coupling portion 125*d*. The coupling portion 125*d* may be coupled to the front cover 105, the frame 130, and/or a back cover 150. That is, it means that the coupling portion 125*d* may be directly coupled to the front cover 105, the frame 130, and/or the back cover 150. Unlike this, the coupling portion 125*d* may be coupled to a structure coupled onto the front cover 105, the frame 130, and/or the back cover 150. That is, it means that the coupling portion 125*d* may be indirectly coupled to the front cover 105, the frame 130, and/or the back cover 150.

The optical layer 123 may include the light source, etc. Specific contents of the optical layer 123 are described in a corresponding part.

The frame 130 may support components of the display device 100. For example, the backlight unit 120, etc., may be coupled to the frame 130. The frame 130 may be configured by a metallic material such as an aluminum alloy, etc.

The back cover 150 may be positioned in the rear of the display device 100. The back cover 150 may protect an internal component from the outside. At least a part of the back cover 150 may be coupled to the frame 130 and/or the front cover 105. The back cover 150 may be an injection product made of a resin.

Figure 3:
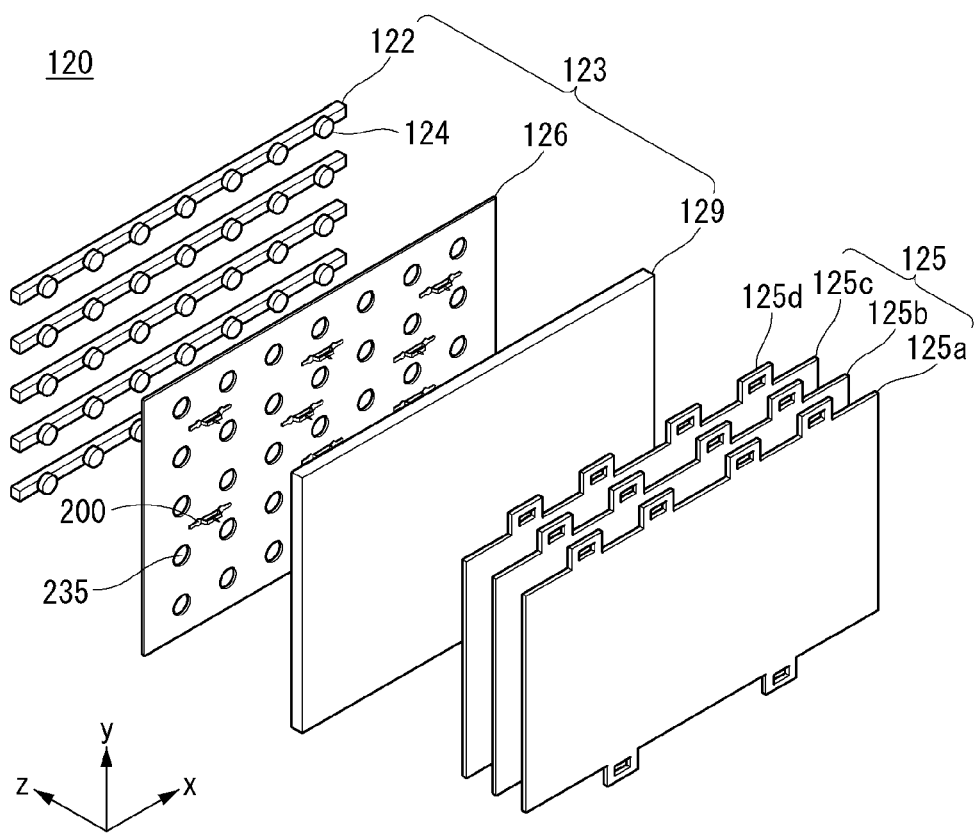

Referring to FIG. 3, the backlight unit 120 may include a substrate 122, at least one optical assembly 124, an optical layer 123 including a reflection sheet 126 and a diffusion plate 129, and an optical sheet 125 positioned in the front of the optical layer 123. The configuration of the backlight unit 120 is not limited thereto, and any one or more among them may also be omitted.

The substrate 122 may be constituted by a plurality of strap forms which are extended in a first direction and are spaced apart from each other by a predetermined interval in a second direction orthogonal to the first direction.

At least one optical assembly 124 may be mounted on the substrate 122. An electrode pattern for connecting an adapter and the optical assembly 124 may be formed on the substrate 122. For example, as the electrode pattern, a carbon nano tube (CNT) electrode pattern may be formed.

The substrate 122 may be composed of at least one of polyethylene terephthalate (PET), glass, polycarbonate (PC), and silicon. The substrate 122 may be a printed circuit board (PCB).

The optical assembly 124 may be disposed on the first substrate 122 at a predetermined interval in the first direction. A diameter of the optical assembly 124 may be larger than a width of the substrate 122. That is, it means that the diameter of the optical assembly 124 may be larger than a second-direction length of the substrate 122.

The optical assembly 124 may be a light emitting diode chip or a light emitting diode package including at least one light emitting diode chip.

The optical assembly 124 may be constituted by a colored LED or a white LED which emits at least one color among the colors such as the red, the blue, the green, etc. The colored LED may include at least one of a red LED, a blue LED, and a green LED.

The light source included in the optical assembly 124 may be a chip on board (COB) type. The COB type may be a type in which an LED chip as the light source is directly coupled to the substrate 122. This may simplify a manufacturing process. Further, a resistance may be lowered, and as a result, energy lost due to heat may be reduced. That is, it means that power efficiency of the optical assembly 124 may be increased. The COB type may provide a brighter illumination. The COB type may provide a smaller thickness and a smaller weight than the related art.

The reflection sheet 126 may be positioned on the front surface of the substrate 122. The reflection sheet 126 may include a through-hole 235 and the optical assembly may be inserted into the through-hole 235.

The reflection sheet 126 may reflect the light provided from the optical assembly 124 to the front. Further, the reflection sheet 126 may reflect light reflected from the diffusion plate 129 toward the diffusion plate 129 again.

The reflection sheet 126 may include at least one of a metal and a metal oxide which are reflection materials. For example, the reflection sheet 126 may include a metal and/or a metal oxide having high reflectivity, such as at least any one of aluminum (Al), silver (Ag), gold (Au), and titanium dioxide (TiO2).

The reflection sheet 126 may be formed by depositing and/or coating the metal or the metal oxide on the substrate 122. Ink including the metallic material may be printed on the reflection sheet 126. A deposition layer using a vacuum deposition method such as a thermal deposition method, an evaporation method, or a sputtering method may be formed on the reflection sheet 126. A coating layer and/or a printing layer using a printing method, a gravure coating method, or a silk screen method may be formed on the reflection sheet 126.

An air gap may be positioned between the reflection sheet 126 and the diffusion plate 129. The air gap may widely diffuse the light emitted from the optical assembly 124. A supporter 200 may be positioned between the reflection sheet 126 and the diffusion plate 129 in order to maintain the air gap. The air gap may be referred to as an optical gap.

The resin may be deposited on the optical assembly 124 and/or the reflection sheet 126. The resin may diffuse the light emitted from the optical assembly 124. The diffusion plate 129 may diffuse the light emitted from the optical assembly 124 upward.

The optical sheet 125 may be positioned in front of the diffusion plate 129. The rear surface of the optical sheet 125 may face the diffusion plate 129 and the front surface of the optical sheet 125 may face the rear surface of the display panel 110.

The optical sheet 125 may include at least one sheet. Specifically, the optical sheet 125 may include one or more prism sheets and/or one or more diffusion sheets. A plurality of sheets included in the optical sheet 125 may be in a bonding and/or close contact state.

The optical sheet 125 may be constituted by a plurality of sheets having different functions. For example, the optical sheet 125 may include first to third optical sheets 125*a* to 125*c*. The first optical sheet 125*a* may have a function of the diffusion sheet and the second and third optical sheets 125*b* and 125*c* may have a function of the prism sheet. The numbers and/or locations of the diffusion sheets and the prism sheets may be changed.

The diffusion sheet may make the distribution of the light uniform by preventing the light emitted from the diffusion plate from being partially concentrated. The prism sheet collects the light emitted from the diffusion sheet to make the light be vertically incident in the display panel 110.

The coupling portion 125*d* may be formed on at least one of one side or an edge of the optical sheet 125. The coupling portion 125*d* may be formed on at least one of the first to third optical sheets 125*a* to 125*c*.

The coupling portion 125d may be formed on at least one of a long side or the edge of the optical sheet 125. The coupling portion 125d formed on a first long side and a coupling portion 125d formed on a second long side may be asymmetric. For example, it means that locations and/or the number of the coupling portions 125d of the first long side and the coupling portions 125d of the second long side may be different from each other.

Figure 4:
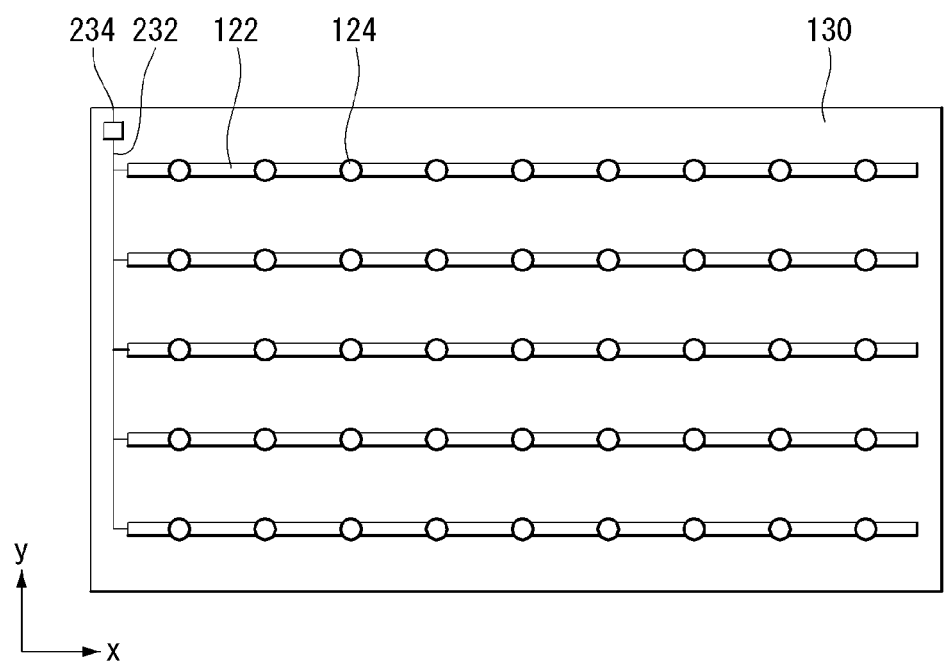

Referring to FIG. 4, the substrate 122 may be provided, which is constituted by a plurality of strap forms which are extended in the first direction and are spaced apart from each other by a predetermined interval in the second direction orthogonal to the first direction. One side of each of the plurality of substrates 122 may be connected to a wiring electrode 232.

The wiring electrode 232 may be extended in the second direction. The wiring electrode 232 may be connected to one side of the substrate 122 by a predetermined interval in the second direction.

A wiring hole 234 may be formed at one-side end of the wiring electrode 232. The wiring hole 234 may be a minute hole penetrating the frame 130. The wiring electrode 232 may be extended to the rear surface of the frame 130 through the wiring hole 234. The wiring electrode 232 may be electrically connected to an adapter (not illustrated) positioned on the rear surface of the frame 130 through the wiring hole 234.

The optical assembly 124 may be mounted on the substrate 122 at a predetermined interval in the first direction. The diameter of the optical assembly 124 may be larger than a second-direction width of the substrate 122.

Figure 5:
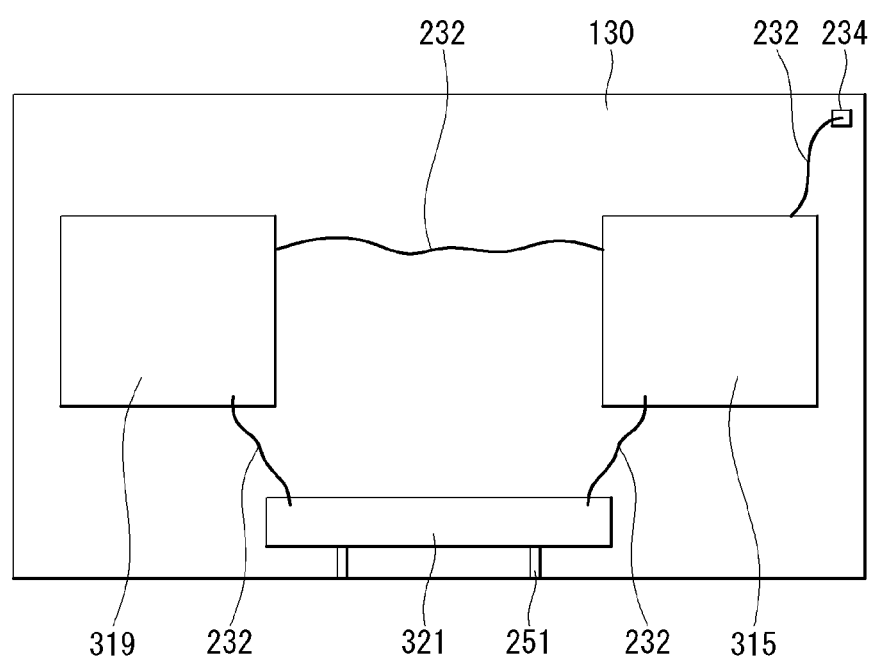

Referring to FIG. 5, the wiring electrode 232 extended on the front surface of the frame 130 may be electrically connected to a power supply 315 through the wiring hole 234. The power supply 315 may be a printed circuit board that supplies power to the display device 100. The power supply 315 may change AC power into DC power.

The power supply 315 may supply current to the optical assembly 124 through the wiring electrode 232. The power supply 315 may be electrically connected to a main board 321 through the wiring electrode 232. The main board 321 may be spaced apart from the power supply 315 by a predetermined interval.

The main board 321 may be a printed circuit board that provides an interface for operating the display device 100. Further, the main board 321 may inspect and manage an operation state of each of components of the display device 100.

The main board 321 and the power supply 315 may be electrically connected to a T-con board 319 the wiring electrode 232. The T-con board 319 may be a printed circuit board which transfers a power or a signal input from the main board 321 or the power supply 315 to the display panel 110. The T-con board 319 may be electrically connected to the display panel on the front surface of the frame 130 through a flat flex cable (FFC) 251.

It is illustrated that respective printed circuit boards are connected to each other, but the present disclosure is not limited thereto and only at least some of the respective printed circuit boards may also be connected to each other.

Figure 6:
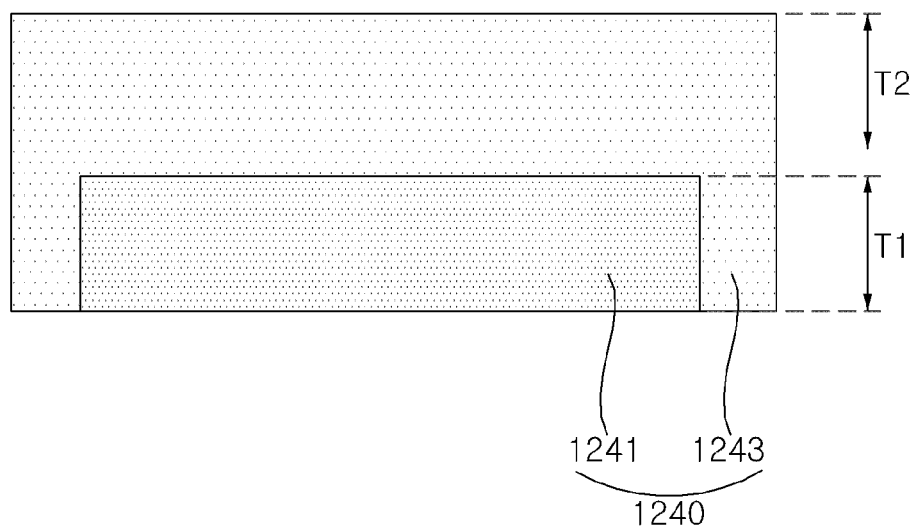
FIGS. 6 and 7 are diagrams illustrating examples of a light source provided in the display device according to an embodiment of the present disclosure.

Referring to FIG. 6, a light source 1240 may be, for example, an LED package. The LED package may include a flip chip. The light source 1240 may include an LED chip 1241 and a sealing material 1243. For example, the LED CHP 1241 may have a thickness T1 of 200 micrometers. The sealing material 1243 may include a phosphor. For example, the LED chip 1241 may be a blue LED, and the phosphor included in the sealing material 1244 may be a yellow-series or red-series phosphor. As a result, the light source 1240 may provide white light. For example, the sealing material 1243 may have a thickness T2 of 200 micrometers. The sealing material 1243 may surround the LED chip 1241.

Figure 7:
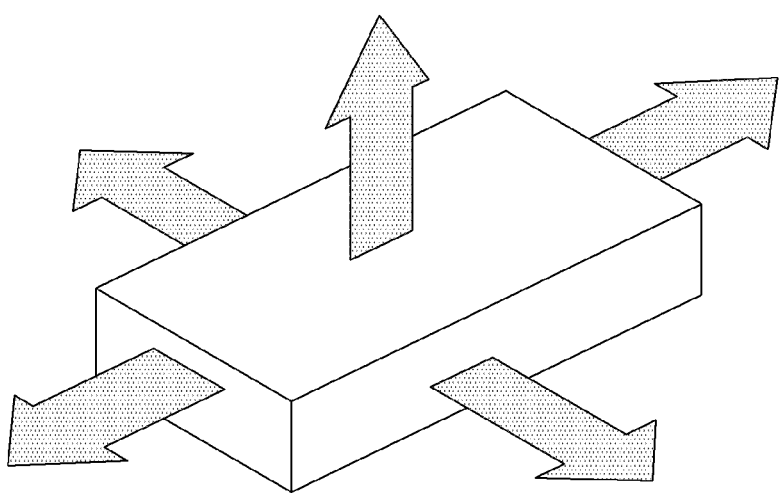
Figure 8:
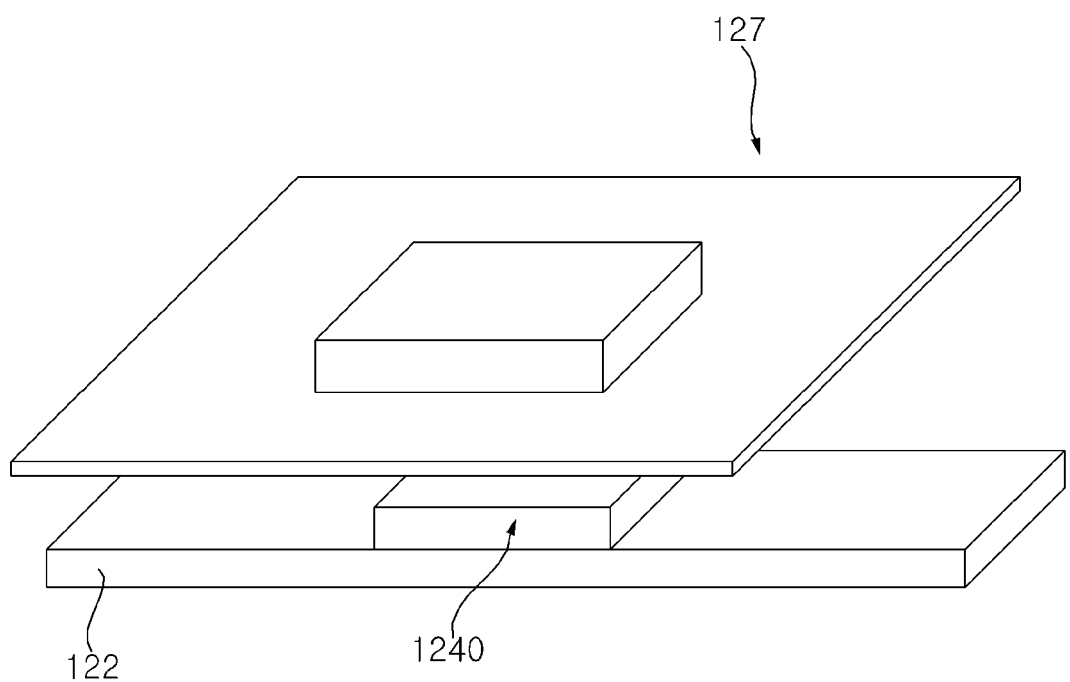
FIGS. 8 to 20 are diagrams illustrating examples of a light source and a light guide panel provided in the display device according to embodiments of the present disclosure.

Referring to FIGS. 7 and 8, the light source 1240 may perform multi-surface emitting. The light source 1240 may be an LED capable of 5-surface emitting. For example, the LED may be a flip chip type. A light guide panel 127 may be positioned on the substrate 122 and the light source 1240. A reflection layer may be applied to the front surface of the substrate 122. The light guide panel 127 may be a rectangular plate shape on the whole. One light guide panel 127 may correspond to one light source 1240.

Figure 9:
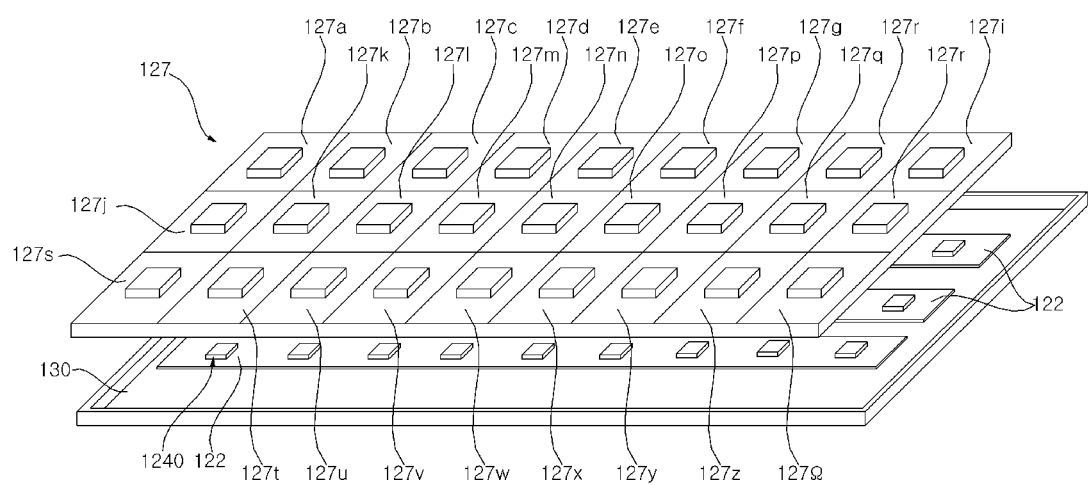

Referring to FIG. 9, a plurality of light guide panels 127 may correspond to a plurality of light sources 1240. The light guide panels 127 may be positioned on the plurality of light sources 1240, respectively. A $12^{th}$ light guide panel 127b may be adjacent to a $11^{th}$ light guide panel 127a, a $13^{th}$ light guide panel 127c may be adjacent to the $12^{th}$ light guide panel 127b, and a $14^{th}$ light guide panel 127d may be adjacent to the $13^{th}$ light guide panel 127c. Further, a $21^{st}$ light guide panel 127j may be adjacent to the $11^{th}$ light guide panel 127a and a $31^{st}$ light guide panel 127s may be adjacent to the $21^{st}$ light guide panel 127j. The plurality of light guide panels 127 may be disposed while forming a row and a column. In this case, the plurality of light guide panels 127 may be spaced apart from each other.

Figure 10:
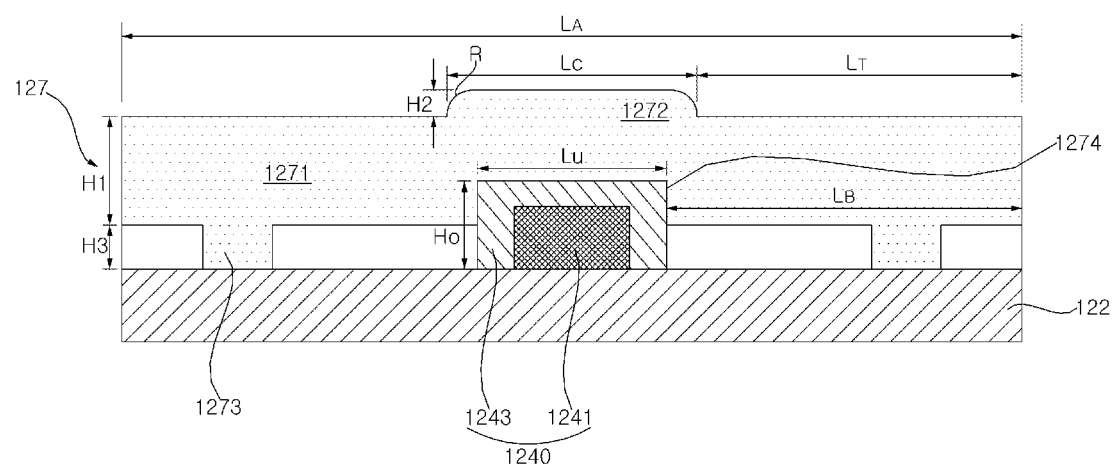

Referring to FIG. 10, the light guide panel 127 may include a flat plate portion 1271 and a lens portion 1272. The flat plate portion 1271 may be a rectangular-shape plate. The lens portion 1272 may be the rectangular-shape plate, and may have a larger size than the light source 1240 and may be smaller size than the flat plate portion 1271.

A height H1 of the flat plate portion 1271 may be larger than a height H0 of the light source 1240. For example, the height H1 of the flat plate portion 1271 may be 1.2 to 1.5 times larger than the height H0 of the light source 1240. A width LA of an upper surface of the flat plate portion 1271 may be larger than a width LU of the upper surface of the light source 1240. For example, the width L1 of the upper surface of the flat plate portion 1271 may be 4 to 5 times larger than the width LU of the upper surface of the light source 1240.

The lens portion 1272 may be positioned at a top of the light source 1240. The lens portion 1272 may be positioned at the center of the upper surface of the flat plate portion 1271. A length LC of the lower surface of the lens portion 1272 may be larger than a length LU of the upper surface of the light source 1240. For example, the length LC of the lower surface of the lens portion 1272 may be 1.1 to 1.2 times larger than the length LU of the upper surface of the light source 1240. A circumference of the upper surface of the lens portion 1272 may be rounded (R).

A distance LT between a side surface terminal of the lens portion 1272 and the side surface of the flat plate portion 1271 may be smaller than a distance LB between the side surface of the light source 1240 and the side surface of the flat plate portion 1271. For example, the distance LB between the side surface of the light source 1240 and the side surface of the flat plate portion 1271 may be 1.2 to 1.3 times larger than the distance LT between the side surface terminal of the lens portion 1272 and the side surface of the flat plate portion 1271.

A height H2 of the lens portion 1272 may be smaller than the height H1 of the flat plate portion 1271. For example, the height H1 of the flat plate portion 1271 may be 4 to 6 times larger than the height H2 of the lens portion 1272. A leg 1273 may be extended toward the substrate 122 from the lower surface of the flat plate portion 1271. A height H3 of the leg 1273 may be smaller than the height H0 of the light source 1240. The lower surface of the flat plate portion 1271 may include an accommodation groove 1274 into which the light source 1240 is inserted and the light source 1240 may be inserted into the accommodation groove 1274 of the flat plate portion 1271. The height H0 of the light source 1240 may be larger than the height H3 of the leg 1273. For example, the height H0 of the light source 1240 may be 1.5 to 2 times larger than the height H3 of the leg 1273.

Figure 11:
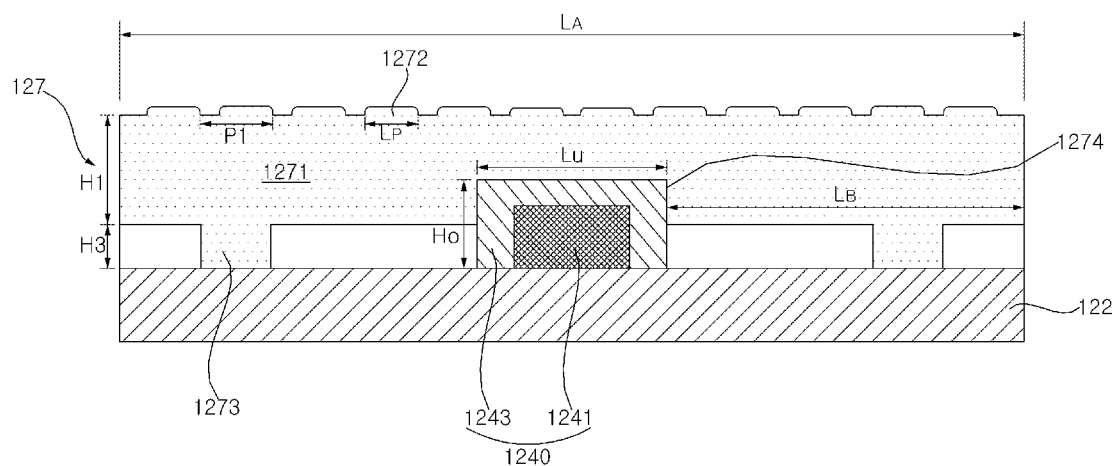

Referring to FIG. 11, the lens portion 1272 may protrude on the upper surface of the flat plate portion 1271 and form a pattern. A width LP of a lower surface of the lens portion 1272 may be smaller than the width LU of the upper surface of the light source 1240. For example, the width LP of the lower surface of the lens portion 1272 may be ¼ to ⅕ of the width LU of the upper surface of the light source 1240. Pitches P1 of the lens portions 1272 may be larger than the width LP of the lower surface of the lens portion 1272. For example, the pitches P1 of the lens portions 1272 may be 1.2 to 1.5 times the width LP of the lower surface of the lens portion 1272.

Figure 12:
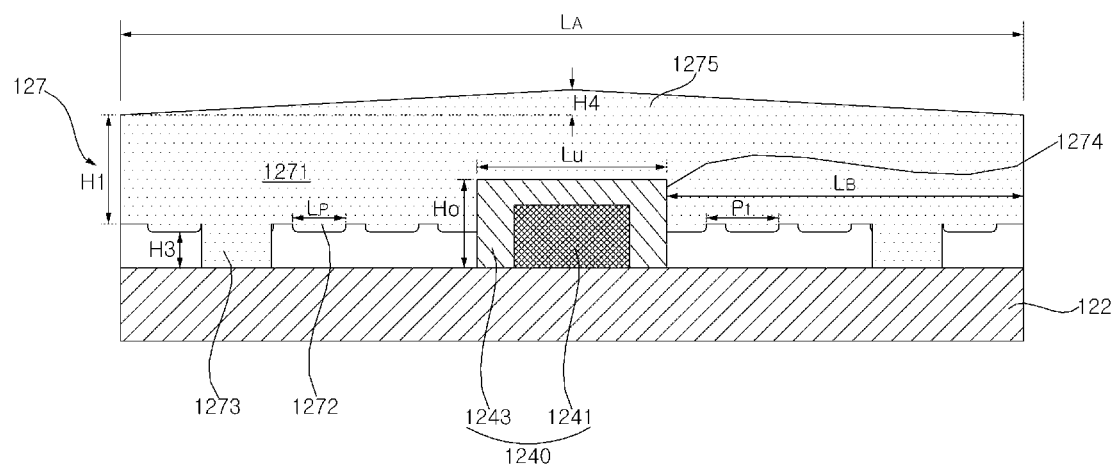

Referring to FIG. 12, the lens portion 1272 may protrude on the lower surface of the flat plate portion 1271 and form the pattern. The width LP of the upper surface of the lens portion 1272 may be smaller than the width LU of the upper surface of the light source 1240. For example, the width LP of the upper surface of the lens portion 1272 may be ¼ to ⅕ of the width LU of the upper surface of the light source 1240. The pitches P1 of the lens portions 1272 may be larger than the width LP of the upper surface of the lens portion 1272. For example, the pitches P1 of the lens portions 1272 may be 1.2 to 1.5 times the width LP of the lower surface of the lens portion 1272.

A dome portion 1275 may be formed on the upper surface of the flat plate portion 1271. The dome portion 1275 may be a cone embossed shape on the whole. A height H4 of the dome portion 1275 may be smaller than the height H1 of the flat plate portion 1271. For example, the height H4 of the dome portion 1275 may be ⅓ to ¼ of the height H1 of the flat plate portion 1271.

Figure 13:
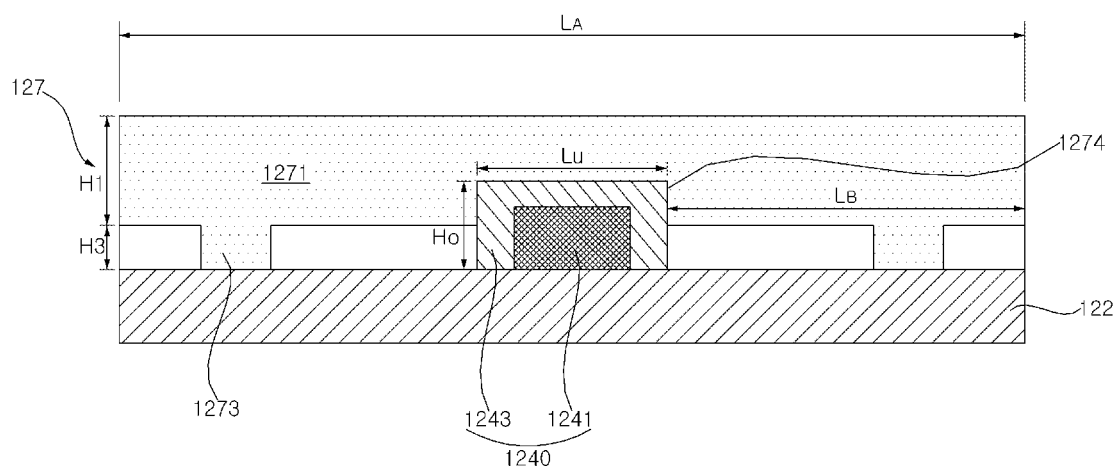

Referring to FIG. 13, the height H1 of the flat plate portion 1271 may be larger than the height H0 of the light source 1240. For example, the height H1 of the flat plate portion 1271 may be 1.2 to 1.5 times larger than the height H0 of the light source 1240. The width LA of the upper surface of the flat plate portion 1271 may be larger than the width LU of the upper surface of the light source 1240. For example, the width LA of the upper surface of the flat plate portion 1271 may be 3 to 4 times larger than the width LU of the upper surface of the light source 1240.

The leg 1273 may be extended toward the substrate 122 from the lower surface of the flat plate portion 1271. The height H3 of the leg 1273 may be smaller than the height H0 of the light source 1240. The lower surface of the flat plate portion 1271 may include an accommodation groove 1274 into which the light source 1240 is inserted and the light source 1240 may be inserted into the accommodation groove 1274 of the flat plate portion 1271. The height H0 of the light source 1240 may be larger than the height H3 of the leg 1273. For example, the height H0 of the light source 1240 may be 1.2 to 1.5 times larger than the height H3 of the leg 1273.

Figure 14:
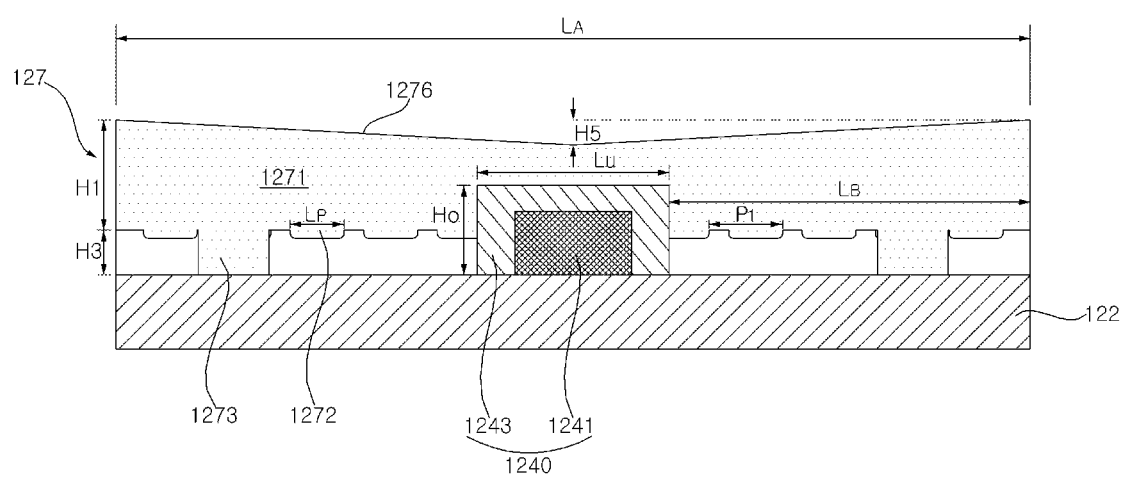

Referring to FIG. 14, the lens portion 1272 may protrude on the lower surface of the flat plate portion 1271 and form the pattern. The width LP of the upper surface of the lens portion 1272 may be smaller than the width LU of the upper surface of the light source 1240. For example, the width LP of the upper surface of the lens portion 1272 may be ¼ to ⅕ of the width LU of the upper surface of the light source 1240. The pitches P1 of the lens portions 1272 may be larger than the width LP of the upper surface of the lens portion 1272. For example, the pitches P1 of the lens portions 1272 may be 1.2 to 1.5 times the width LP of the lower surface of the lens portion 1272.

A depression 1276 may be formed on the upper surface of the flat plate portion 1271. The depression 1276 may be a cone engraved shape on the whole. A depth H5 of the depression 1276 may be smaller than the height H1 of the flat plate portion 1271. For example, the height H5 of the depression 1276 may be ⅓ to ¼ of the height H1 of the flat plate portion 1271.

Figure 15:
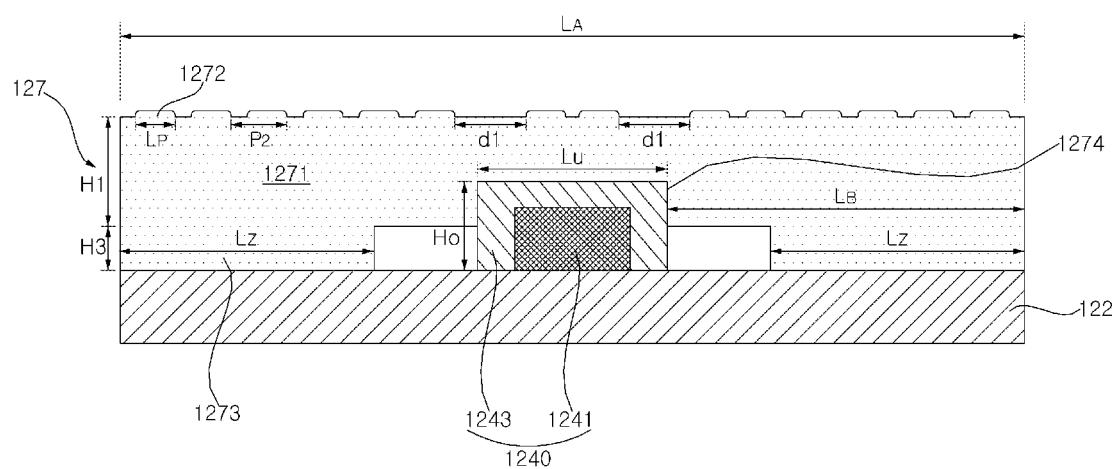

Referring to FIG. 15, the lens portion 1272 may protrude on the upper surface of the flat portion 1271 and form the pattern. The width LP of a lower surface of the lens portion 1272 may be smaller than the width LU of the upper surface of the light source 1240. For example, the width LP of the lower surface of the lens portion 1272 may be ⅐ to ⅒ of the width LU of the upper surface of the light source 1240.

Pitches P2 of the lens portions 1272 may be larger than the width LP of the lower surface of the lens portion 1272. For example, the pitches P2 of the lens portions 1272 may be 1.1 to 1.3 times the width LP of the lower surface of the lens portion 1272. The pitches P2 of the lens portions 1272 may be changed. The lens portions 1272 may form a predetermined pattern at a central area o the flat plate portion 1272. The lens portions 1272 may form the predetermined pattern at the central area of the flat plate portion 1272 at a predetermined spacing distance d1 again. For example, the spacing distance d1 may be ½ to ⅔ of the width of the upper surface of the light source 1240.

Figure 16:
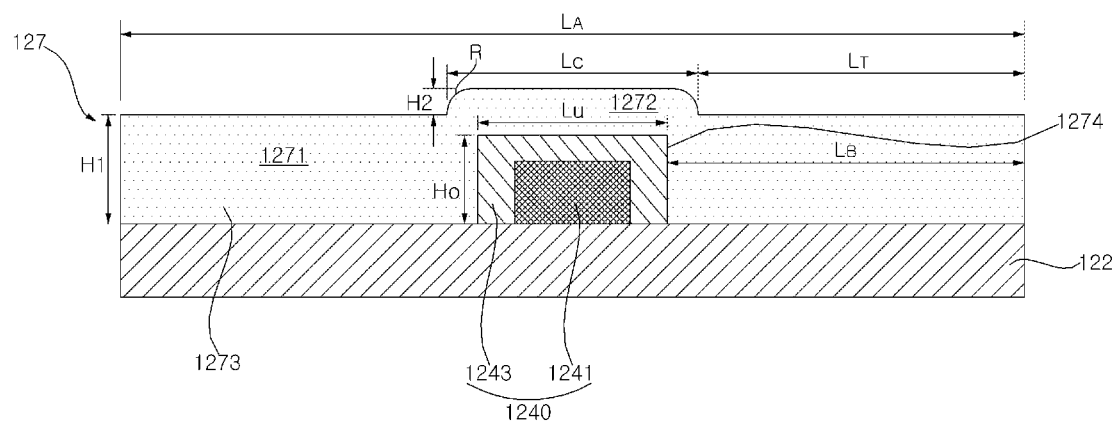

Referring to FIG. 16, the height H1 of the flat plate portion 1271 may be larger than the height H0 of the light source 1240. For example, the height H1 of the flat plate portion 1271 may be 1.1 to 1.2 times larger than the height H0 of the light source 1240. The width LA of the upper surface of the flat plate portion 1271 may be larger than the width LU of the upper surface of the light source 1240. For example, the width LA of the upper surface of the flat plate portion 1271 may be 3 to 4 times larger than the width LU of the upper surface of the light source 1240.

The lens portion 1272 may be positioned at the top of the light source 1240. The lens portion 1272 may be positioned at the center of the upper surface of the flat portion 1271. The length LC of the lower surface of the lens portion 1272 may be larger than the length LU of the upper surface of the light source 1240. For example, the length LC of the lower surface of the lens portion 1272 may be 1.1 to 1.2 times larger than the length LU of the upper surface of the light source 1240. The circumference of the upper surface of the lens portion 1272 may be rounded (R).

The distance LT between the side surface terminal of the lens portion 1272 and the side surface of the flat plate portion 1271 may be smaller than the distance LB between the side surface of the light source 1240 and the side surface of the flat plate portion 1271. For example, the distance LB between the side surface of the light source 1240 and the side surface of the flat plate portion 1271 may be 1.1 to 1.2 times larger than the distance LT between the side end terminal of the lens portion 1272 and the side surface of the flat plate portion 1271.

The height H2 of the lens portion 1272 may be smaller than the height H1 of the flat plate portion 1271. For example, the height H1 of the flat plate portion 1271 may be 2.5 to 3 times larger than the height H2 of the lens portion 1272.

The leg 1273 may have a large width LZ. The width LZ of the leg 1273 may be ⅔ to ¾ of the distance LB between the side surface terminal of the light source 1240 and the side surface of the flat late portion 1271. A layer including the metal may be formed on the lower surface of the leg 1273, and melted and coupled onto the substrate 122.

Figure 17:
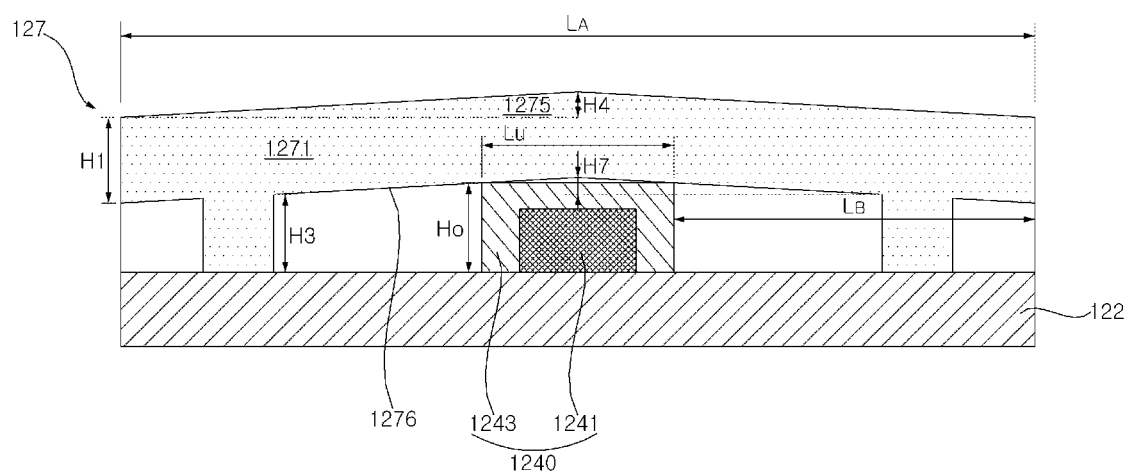

Referring to FIG. 17, the dome potion 1275 may be formed on the upper surface of the flat plate portion 1271. The dome portion 1275 may be the cone embossed shape on the whole. The height H4 of the dome portion 1275 may be smaller than the height H1 of the flat plate portion 1271. For example, the height H4 of the dome portion 1275 may be ⅓ to ¼ of the height H1 of the flat plate portion 1271.

The depression 1276 may be formed on the lower surface of the flat plate portion 1271. The depression 1276 may be the cone engraved shape on the whole. A depth H7 of the depression 1276 may be smaller than the height H1 of the flat plate portion 1271. For example, the height H7 of the depression 1276 may be ¼ to ⅙ of the height H1 of the flat plate portion 1271.

Figure 18:
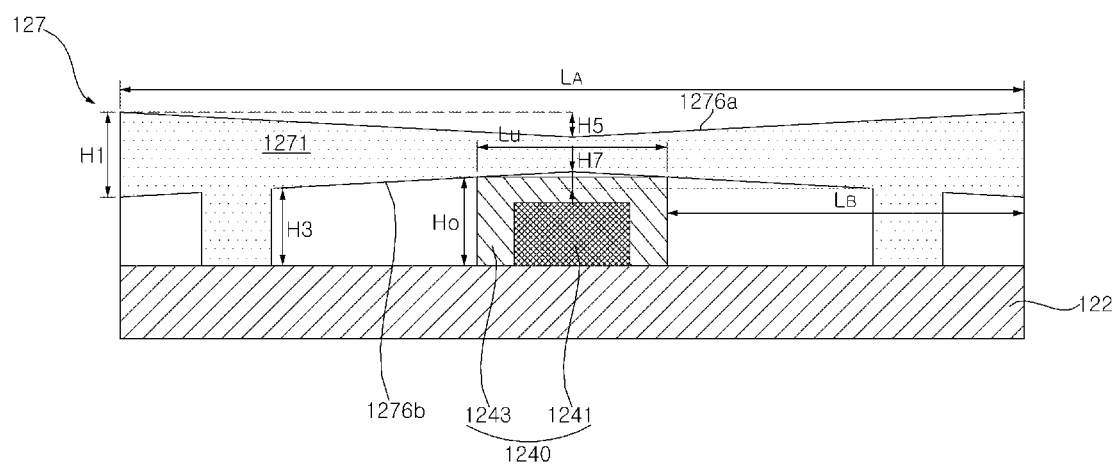

Referring to FIG. 18, a first depression 1276a may be formed on the upper surface of the flat plate portion 1271. The first depression 1276a may be the cone engraved shape on the whole. A depth H5 of the first depression 1276a may be smaller than the height H1 of the flat plate portion 1271. For example, the height H5 of the first depression 1276a may be ⅓ to ¼ of the height H1 of the flat plate portion 1271.

A second depression 1276b may be formed on the lower surface of the flat plate portion 1271. The second depression 1276b may be the cone engraved shape on the whole. A depth H7 of the second depression 1276b may be smaller than the height H1 of the flat plate portion 1271. For example, the depth H7 of the second depression 1276b may be ¼ to ⅙ of the height H1 of the flat plate portion 1271.

Figure 19:
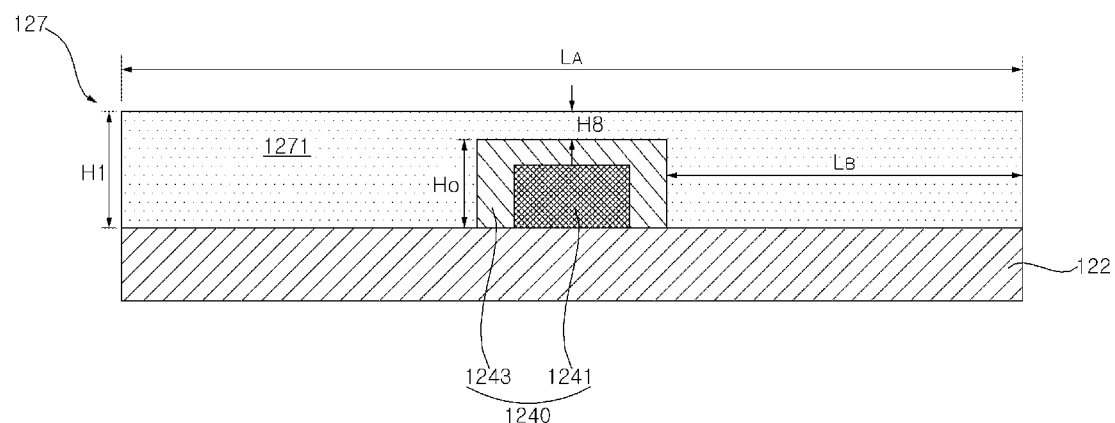

Referring to FIG. 19, a distance H8 between the upper surface of the flat plate portion 1271 and the upper surface of the light source 1240 may be smaller than the height H0 of the light source 1240. For example, the distance H8 between the upper surface of the flat plate portion 1271 and the upper surface of the light source 1240 may be ¼ to ⅕ of the height H0 of the light source 1240.

Figure 20:
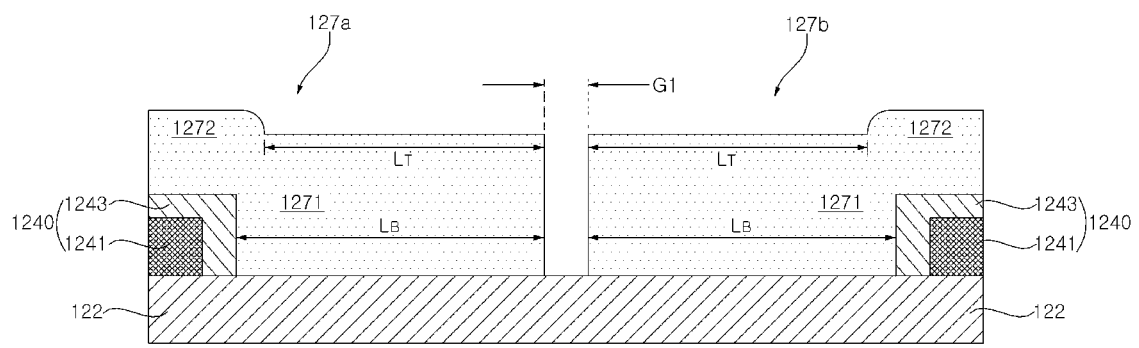

Referring to FIG. 20, the 11$^{th}$ light guide panel 127a may be spaced apart from the 12$^{th}$ light guide panel 127b by a predetermined distance G1. The distance G1 between the light guide panels 127a and 127b may be in inverse proportion to the distance LB between the side surface terminal of the light source 1240 and the side surface of the flat plate portion 1271. For example, the distance G1 between the light guide panels 127a and 127b may be in inverse proportion to the distance LB between the side surface terminal of the light source 1240 and the side surface of the flat plate portion 1271. The distance G1 formed between the light guide panels 127a and 127b may mean a distance formed between the row and the column of the light guide panels 127 (alphabet) described with reference to FIG. 9. Further, the distance G1 formed between the light guide panels 127a and 127b may be applied to the distance between the light guide panels 127 described with reference to FIGS. 10 to 19.

Figure 21:
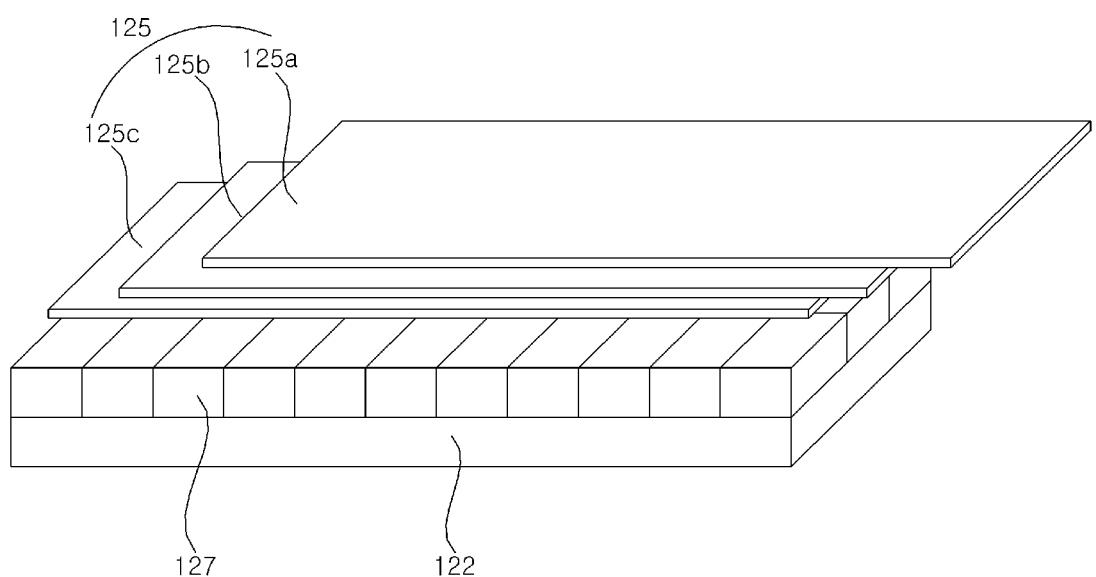
FIGS. 21 and 22 are diagrams illustrating examples of a cross section of the display device according to embodiments of the present disclosure.
Figure 22:
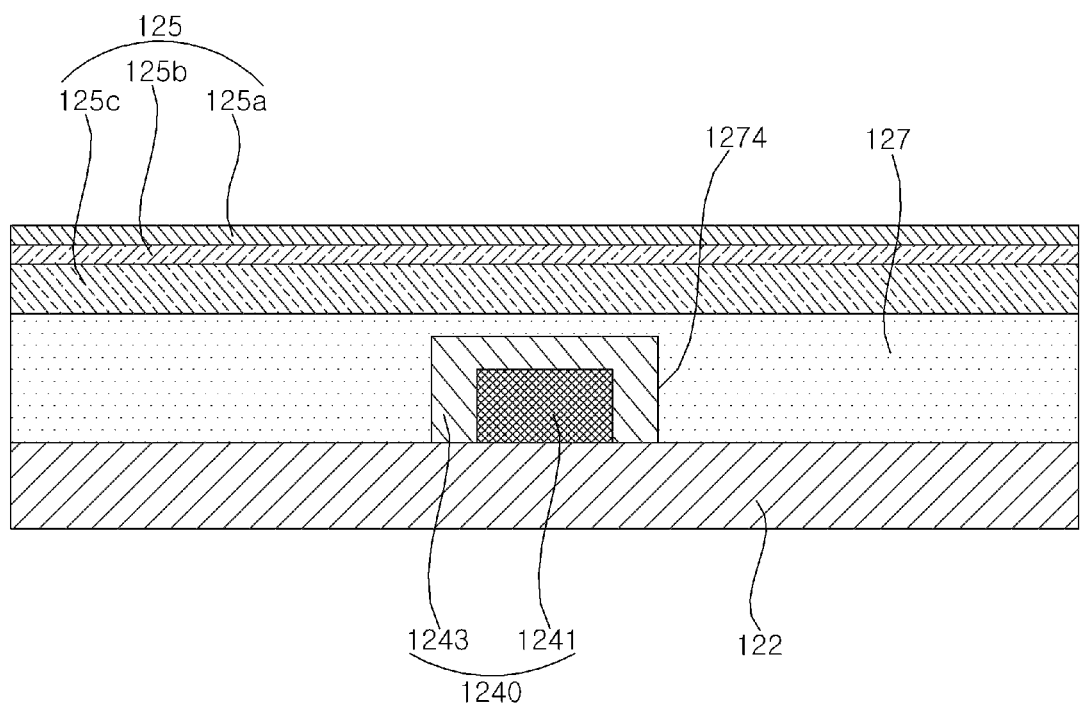

Referring to FIGS. 21 and 22, the optical sheet 125 may be placed on the light guide panel 127. The lower surface of the optical sheet 125 may be adjacent to or in contact with the light guide panel 127. The optical sheet 125 may include at least one prism sheet 125c and 125b and at least one diffusion sheet 125a. For example, the optical sheet 125 may include a first prism sheet 125c, a second prism sheet 125b, and the diffusion sheet 125a. The first prism sheet 125c may be in contact with the upper surface of the light guide panel 127. The second prism sheet 125b may be in contact with the upper surface of the first prism sheet 125c. The diffusion sheet 125a may be in contact with the upper surface of the second prism sheet 125b.

As a result, even though the optical gap is not present or not sufficient between the light source 1240 and the optical sheet 125, the light provided from the light source 1240 may be evenly provided to the display panel 110 (see FIG. 2).

Further, the plurality of light sources 1240 may be disposed close to the display panel 110 to enhance the light efficiency of the backlight unit and the magnitude of the current provided to the light sources 1240 to reduce power consumption.

Further, the light provided by the plurality of light sources 1240 is incident in the light guide panel 127 to minimize optical loss.

According to an aspect of the present disclosure, a display device may be provided, which includes: a display panel; a frame positioned in a rear of the display panel; a first light source positioned between the display panel and the frame, and providing light to the display panel; a second light source adjacent to the first light source, and positioned spaced apart from the first light source; a substrate mounted with the first and second light sources, and positioned on a front surface of the frame; a first light guide panel positioned on the substrate and the first light source; and a second light guide panel positioned on the substrate and the second light source, and spaced apart from the first light guide panel.

Further, according to another aspect of the present disclosure, the first light source may be a rectangular shape, the first light guide panel may be a rectangular shape corresponding to a shape of the first light source, but may be larger than a size of the first light source, and the second light source may be the rectangular shape, and the second light guide panel may be a rectangular shape corresponding to the shape of the second light source, but may be larger than the size of the second light source.

Further, according to another aspect of the present disclosure, a distance between a first side surface of the first light guide panel and a second side surface of the second light guide panel, which faces the first side surface may be smaller than a distance between a side surface of the first light source and the side surface of the first light guide panel.

Further, according to another aspect of the present disclosure, the distance between the first side surface of the first light guide panel and the second side surface of the second light guide panel, which faces the first side surface may be smaller than a thickness of the first light guide panel or the second light guide panel.

Further, according to another aspect of the present disclosure, the first light guide panel may include a flat plate portion having a plate shape, and an accommodation groove formed on a lower surface of the flat plate portion and inserted with the first light source.

Further, according to another aspect of the present disclosure, the first light guide panel may further include a lens portion formed on an upper surface of the flat plate portion at a top of the light source, and a width of the lower surface of the lens portion may be larger than the width of the upper surface of the light source.

Further, according to another aspect of the present disclosure, the first light guide panel may further include a lens portion formed on the upper surface of the flat plate portion, and the width of the lower surface of the lens portion may be smaller than the width of the upper surface of the light source.

Further, according to another aspect of the present disclosure, there may be a plurality of lens portions, the plurality of lens portions may form a pattern on the upper surface of the flat plate portion, and a pitch of the pattern of the plurality of lens portions may be larger than the width of the lower surface of the lens portion.

Further, according to another aspect of the present disclosure, the first light guide panel may further include a lens portion formed on the lower surface of the flat plate portion, the width of the upper surface of the lens portion may be smaller than the width of the upper surface of the light source, there may be a plurality of lens portions, the plurality of lens portions may form the pattern on the lower surface of the flat plate portion, and the pitch of the pattern of the plurality of lens portions may be larger than the width of the upper surface of the lens portion.

Further, according to another aspect of the present disclosure, the first light guide panel may further include an embossed dome formed on the upper surface of the flat plate portion, and a height of the dome may be smaller than the thickness of the flat plate portion.

Further, according to another aspect of the present disclosure, the first light guide panel may further include an engraved dome formed on the upper surface of the flat plate portion, and a depth of the dome may be smaller than the thickness of the flat plate portion.

Further, according to another aspect of the present disclosure, the first light guide panel may further include an engraved dome formed on the lower surface of the flat plate portion, and the depth of the dome may be smaller than the thickness of the flat plate portion.

Certain embodiments or other embodiments of the present disclosure described above are not mutually exclusive or distinct from each other. Any or all elements of the embodiments of the present disclosure described above may be combined or combined with each other in configuration or function.

For example, the case means that a configuration A described in a specific embodiment and/or figure and a configuration B described in another embodiment and/or figure are may be combined with each other. Namely, although the combination between the components is not directly described, the combination is possible except in the case where it is described that the combination is impossible.

It should be considered that the detailed description should not be construed as restrictive in all terms and is exemplary. The scope of the present disclosure should be determined by rational construing of the appended claims and all modifications within an equivalent scope of the present disclosure are included in the scope of the present disclosure.

The invention claimed is:

1. A display device comprising:
a display panel;
a frame positioned in a rear of the display panel;
a first light source positioned between the display panel and the frame, and providing light to the display panel;
a second light source adjacent to the first light source, and positioned spaced apart from the first light source;
a substrate mounted with the first and second light sources, and positioned on a front surface of the frame;
a first light guide panel positioned on the substrate and the first light source; and
a second light guide panel positioned on the substrate and the second light source, and spaced apart from the first light guide panel,
wherein the first light guide panel and the second light guide panel each comprise a flat plate portion having a plate shape and a plurality of legs protruding downward from the flat plate portion toward the substrate such that a gap is formed between the substrate and areas of the flat plate portion surrounding the first and second light sources.

2. The display device of claim 1, wherein the first light source is a rectangular shape,
the first light guide panel is a rectangular shape corresponding to a shape of the first light source, a size of the first light guide panel is larger than a size of the first light source, and
the second light source is the rectangular shape, and
the second light guide panel is a rectangular shape corresponding to the shape of the second light source, a size of the second light guide panel is larger than a size of the second light source.

3. The display device of claim 2, wherein a distance between a first side surface of the first light guide panel and a second side surface of the second light guide panel is smaller than a distance between a side surface of the first light source and the side surface of the first light guide panel, and wherein the second side surface of the second light guide panel faces the first side surface of the first light guide panel.

4. The display device of claim 2, wherein a distance between the first side surface of the first light guide panel and a second side surface of the second light guide panel is smaller than a thickness of the first light guide panel or the second light guide panel, and wherein the second side surface of the second light guide panel faces the first side surface of the first light guide panel.

5. The display device of claim 4, wherein the first light guide panel includes
an accommodation groove formed on a lower surface of the flat plate portion, wherein the first light source is inserted into the accommodation groove.

6. The display device of claim 5, wherein the first light guide panel further includes
a lens portion formed on an upper surface of the flat plate portion at an upper surface of the light source, and
a width of the lower surface of the lens portion is larger than a width of the upper surface of the light source.

7. The display device of claim 5, wherein the first light guide panel further includes
a lens portion formed on an upper surface of the flat plate portion, and
a width of the lower surface of the lens portion is smaller than a width of the upper surface of the light source.

8. The display device of claim 7, wherein the lens portion includes a plurality of lens portions,
the plurality of lens portions forms a pattern on the upper surface of the flat plate portion, and
a pitch of the pattern of the plurality of lens portions is larger than the width of the lower surface of the lens portion.

9. The display device of claim 5, wherein the first light guide panel further includes
a lens portion formed on the lower surface of the flat plate portion, a width of a upper surface of the lens portion is smaller than a width of the upper surface of the light source, the lens portion includes a plurality of lens portions, the plurality of lens portions forms a pattern on the lower surface of the flat plate portion, and a pitch of the pattern of the plurality of lens portions is larger than a width of the upper surface of the lens portion.

10. The display device of claim 5, wherein the first light guide panel further includes an embossed dome formed on an upper surface of the flat plate portion, and a height of the dome is smaller than the thickness of the flat plate portion.

11. The display device of claim 5, wherein the first light guide panel further includes an engraved dome formed on an upper surface of the flat plate portion, and a depth of the dome is smaller than a thickness of the flat plate portion.

12. The display device of claim 5, wherein the first light guide panel further includes an engraved dome formed on a lower surface of the flat plate portion, and a depth of the dome is smaller than a thickness of the flat plate portion.

13. The display device of claim 5, wherein a height of the first light source is greater than a height of the leg.

\* \* \* \* \*